March 5, 1968  D. P. L. J. COLOMBANI ET AL  3,371,540
FLUID GYROMETER
Filed Dec. 2, 1965  2 Sheets-Sheet 1
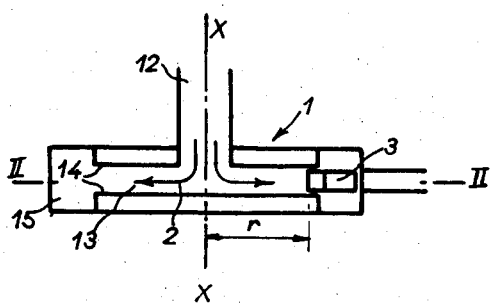
Fig.:1
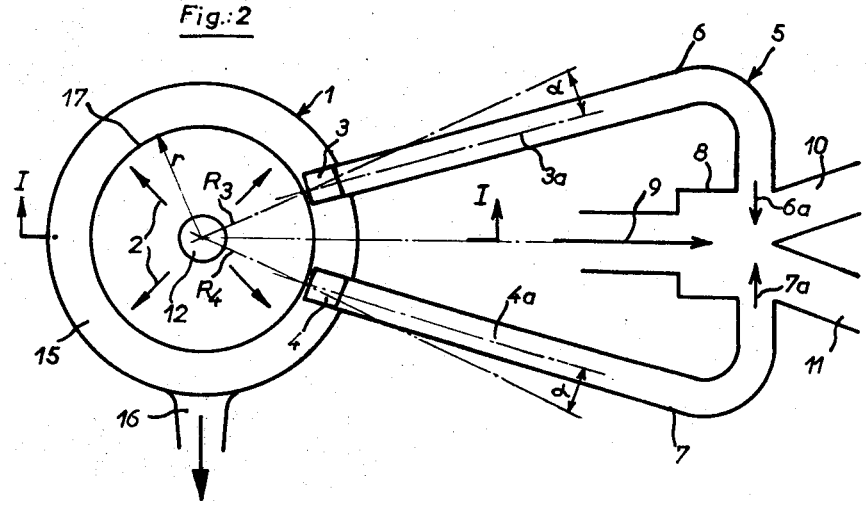
Fig.:2
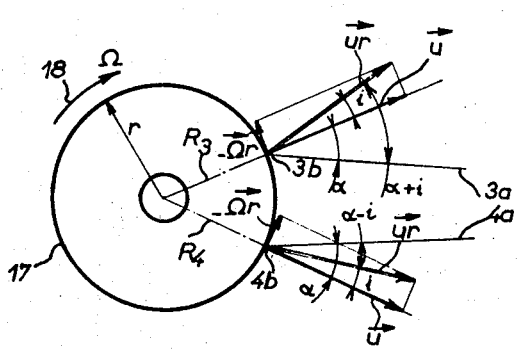
Fig.:3

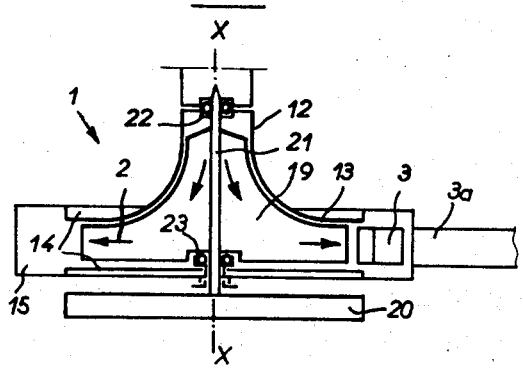
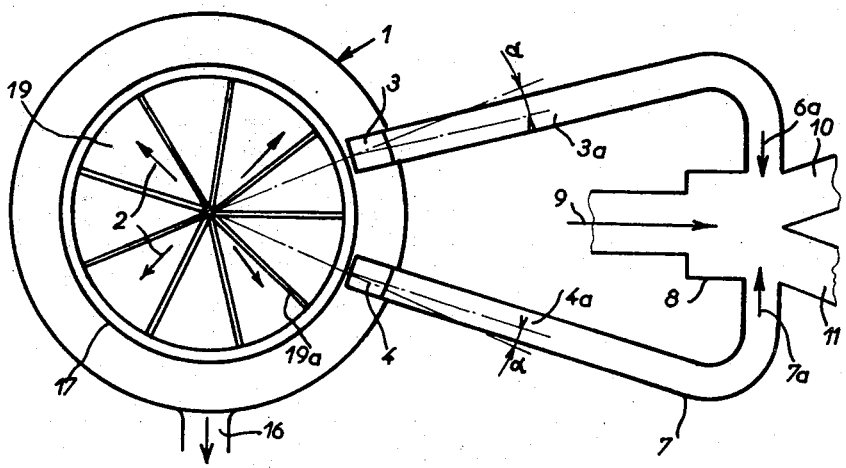

United States Patent Office 3,371,540
Patented Mar. 5, 1968

3,371,540
FLUID GYROMETER
Don Pierre Louis Jean Colombani, Latresne, Adolphe Otton Gontier Ernst, Petit Piqnet, and Janos Rona, Bordeaux, France, assignors to Societe Nationale d'Etude et de Construction de Moteurs d'Aviation, Paris, France, a company of France
Filed Dec. 2, 1965, Ser. No. 511,109
Claims priority, application France, Dec. 4, 1964, 997,479
5 Claims. (Cl. 73—505)

The invention concerns apparatus for the measurement of angular velocities by pneumatic or hydraulic means.

Hitherto devices for stabilizing air, sea and space craft have generally comprised electric and/or electronic circuits; this arises particularly because one of the essential elements thereof, namely the high-gain amplifier, has itself been constituted by a circuit of this nature. Accordingly, the use of electrical and electronic techniques in connection with other components of these devices (such as detectors, connecting networks and servo-mechanisms, for example) has been brought about in order to obtain uniformity in construction and operation.

However, another class of high-gain amplifier is now available for technical application, namely fluid amplifiers based on the deflection of jets of gas or liquid. One form of amplifier of this type is described in Ernst et al. application Ser. No. 299,495 filed on Aug. 2, 1963, now U.S. Patent No. 3,285,262 which discloses a fluid amplifier in the form of an aerodynamic or hydrodynamic servo-valve applicable, in particular, to the guidance and stabilization of rockets.

Now that such aerodynamic, hydrodynamic or hydraulic servo-mechanisms are available, it would be advantageous to provide detectors supplying pneumatic or hydraulic signals, so as to be able to construct purely pneumatic or hydraulic stabilization devices.

Accordingly it is an object of the present invention to provide a fluid gyrometer which can be used, more particularly, for such stabilization purposes but which is, of course, capable of other applications.

The gyrometer provided by the invention enables an angular velocity to be measured by measuring the disturbances caused in the flow of a fluid in a circuit by rotation of the said circuit at the said angular velocity.

The gyrometer provided according to the present invention operates by measuring the difference between the flows of fluid picked up by two nozzles which are off-set angularly in opposite directions relatively to respective radii of a source of fiuid flow and are rotated about the axis of the source at the angular velocity to be measured.

The following description with reference to the accompanying drawings is given by way of non-limitative example only and will make it clearly understood how the invention can be carried into effect. In the drawings:

FIGURE 1 is a diagrammatic section view of one form of a gyrometer according to the invention, on the line I—I of FIGURE 2;

FIGURE 2 is a sectional view on the line II—II of FIGURE 1 showing, also diagrammatically, the high-gain fluid amplifier;

FIGURE 3 is a velocity diagram, corresponding to the view of FIGURE 2;

FIGURES 4 and 5 are views from view-points corresponding to FIGURES 1 and 2, respectively, but showing a modified form of device.

The apparatus of the invention can be used generally for translating an angular velocity into a pneumatic or hydraulic signal. The drawings show a gyrometer which is adapted to be mounted aboard a craft for detecting the angular velocity of the craft about a control axis thereof. The gyrometer is intended to be used in a craft having a pneumatic or hydraulic stabilization system, the pneumatic or hydraulic signal delivered by the gyrometer being applied to the stabilization system for holding the craft in the correct attitude about the said control axis.

Referring to the drawings, the gyrometer 1 of FIGURES 1 and 2 permits, for example, the detection of the angular velocity of a craft such as an aeroplane, space vehicle or ship about an axis X—X by producing, in effect, a flow from a source having the same axis X—X, which flow is represented diagrammatically by the arrows 2, and by measuring the difference between the respective rates of flow of fluid picked up at the periphery of the source by two tubes 3 and 4, the axes $3a$ and $4a$ of which are off-set by the same angle in opposite directions relatively to respective radii $R_3$ and $R_4$ of the source. The gyrometer of FIGURE 1 is fixedly mounted on the craft and the nozzles 3 and 4 are consequently rotated about the axis X—X at the angular velocity to be detected. In FIGURE 2 there is shown, by way of example, one particular form of fluid amplifier 5 (which is aerodynamic or hydrodynamic according to whether the fluid used is a gas or a liquid). The inlet branches 6 and 7 of the amplifier 5 receive the flows delivered by the tubes 3 and 4, respectively, and produce in a deflection chamber 8, jets $6a$ and $7a$ which deflect to a greater or lesser extent, an operational fluid jet 9, so as to distribute fluid between the nozzles 10 and 11 in the same ratio as the ratio of the flows picked up by the tubes 3 and 4, and thus to amplify, in a constant ratio, the difference in the flow-rates detected by the gyrometer. This amplifier 5 permits of obtaining at the nozzles 10 and 11, an amplified signal which is indicative of the angular velocity and which can be used to control a pneumatic or hydraulic device serving to stabilize the craft.

The gyrometer 1 has an inlet nozzle 12 coaxial with the axis X—X and opening into the centre of a space 13 between two circular plates 14 which are normal to the axis X—X, the said space 13 opening at its periphery into an annular collector conduit 15 provided with an outlet 16. A liquid or gaseous fluid is delivered into the nozzle 12 and, at the level at which the said nozzle connects with the cylindrical cavity 13, the flow of the fluid undergoes deflection which converts it into a radial flow, so as to constitute, in effect, flow from an aerodynamic or hydrodynamic source. The flow from this source is collected at the periphery of the cylindrical cavity 13 in the annular collector 15 and is convoyed through the outlet 16 to a reservoir from which it is withdrawn again by the device (not shown) which supplies the nozzle 12. The annular collector 15 should have a cross-section sufficient to ensure that the circumferential flow of fluid in the collector towards the outlet 16 does not disturb the flow 2 from the source, which flow must remain radial.

The flow of fluid into the nozzle 12 is constant and the velocity of the flow 2 therefore decreases according to a hyperbolic law as it moves away from the axis X—X. The value of this velocity at the periphery of the source flow, that is to say on a circle 17 of radius $r$, will be called $$\vec{u}.$$

The tubes 3 and 4 are fixed in the annular collector 15 with their inlets disposed substantially on the circle 17 which represents the periphery of the space 13. The said inlets are arranged normal to the axes $3a$ and $4a$ of the tubes 3 and 4, which axes are off-set, in opposite directions to one another, relatively to the radii $R_3$ and $R_4$ of the said circle, by an angle $\alpha$ in each case. The manner of fixing the tubes 3 and 4 in the collector 15 is not shown, but may be effected by any suitable means. The gyrometer 1 and the amplifier 5 are fixed to the craft, so that they are carried with the latter when it turns about its axis X—X, and the tubes 3 and 4 open axially into the inlet branches 6 and 7 of the amplifier.

At rest, that is to say when the angular velocity of the system about the axis X—X is zero, the two tubes 3 and 4 are supplied in an identical manner. In fact, the flow from the source strikes them at equal angles of incidence and they both pick up from the said source, the same rate of flow or supply of fluid. The fluid which is not picked up by the nozzles 3 and 4 enters the annular collector 15 and the conduit 16 carries it back to the reservoir.

When the craft, on its course, turns at an angular velocity $\Omega$ about the axis X—X, the fluid circulating inside the cavity 13 is carried along and follows the rotation, but only by virtue of the viscous fluid friction at the walls 14. During the first moments of the movement, it may therefore be considered that the fluid disregards the rotation of the device and that the flow 2 remains radial in space. On the other hand, the tubes 3 and 4 are carried with the collector 15 at the velocity $\Omega$ (as indicated by the arrow 18 in FIGURE 3) and thus move circumferentially relatively to the fluid flowing radially in the cavity 13. By reason of this relative movement, the fluid impinges at the inlets of the respective tubes 3 and 4 at different angles of incidence, as shown in FIGURE 3.

The relative velocity $$\vec{u_r}$$

of the fluid at 3a and 3b with respect to the turning craft is the geometrical difference between (or resultant of) the velocity $$\vec{u}$$

which the radial flow 2 exhibits when the craft is assumed not to be turning and the tangential linear velocity $$\vec{\Omega r}$$

tending to entrain the fluid due to the rotation. It will be seen in FIGURE 3 that this velocity $$\vec{u_r}$$

defined by compounding $$\vec{u}$$

and $$-\vec{\Omega r}$$

is inclined, in each case, at an angle $i$ rearwardly relatively to the respective radii $R_3$ and $R_4$.

As will be seen hereinafter, the arrangement ensures that the angle $i$ always remains less than $\alpha$, so that the flow impinges at the tube 3 at an angle $(\alpha+i)$ relatively to the axis 3a and at the tube 4, at an angle $(\alpha-i)$ relatively to the axis 4a. The tube 3 will receive less fluid per unit time than the tube 4, the difference between the flows $Q_3$ and $Q_4$ picked up by the respective tubes being proportional to $i$:

$$Q_4 - Q_3 = ki \qquad (1)$$

$k$ being a constant. Moreover, it will be seen in FIGURE 3 that the angle $i$ is defined by the equation $$\tan i = \frac{\Omega r}{u} \qquad (2)$$

The apparatus can be dimensioned so that the ratio $r/u$ remains small, so that the angle $i$ is approximately proportional to the angular velocity $\Omega$. Thus the output signal from the gyrometer 1, constituted by the difference between the flows in the tubes 3 and 4, is directly proportional to the angular velocity about the axis X—X:

$$Q_4 - Q_3 = C\Omega \qquad (3)$$

C being a constant. It is this signal, amplified by the device 5, which will be used for effecting stabilization of the craft.

It has been stated hereinbefore that the angle $i$ must remain less than $\alpha$ and that the ratio $r/u$ must remain small. It can be seen from the Equation 2 that if the second condition is satisfied, taking account of the possible maximum value of the velocity of rotation $\Omega$, the first condition will also be satisfied. It is easy to achieve these two conditions, in a given apparatus, by delivering into the inlet nozzle 12 a rate of flow of fluid such that the velocity $$\vec{u}$$

at the periphery of the source is relatively large.

FIGURES 4 and 5 show a modification in which, in order to retard the setting in rotation of the fluid, occasioned by the friction with the walls, there is provided a rotor 19, having radial blades 19a and carrying an inertia flywheel 20. The blades 19a are arranged in the part of the device where the axial flow in the nozzle 12 is converted into radial or source flow in the cavity 13. The radially directed plane blades 19a are fixed to a shaft 21 which turns freely in bearings 22 and 23 in the apparatus and the inertia flywheel 20 is keyed on the shaft 21 outside the casing of the apparatus.

When the apparatus 1 fixed to the craft turns about the axis X—X with the latter, the assembly formed by the rotor 19, the shaft 21 and the flywheel 20 remains fixed in space, due to the inertia of the flywheel, so that the flow 2 in the cavity 13 remains radial in space, that is to say, it is held against circumferential movement.

If there is used in the apparatus 1, a fluid whose viscosity is relatively high, it would be possible to provide a rotor 19 whose blades 19a are not plane but are helical, similarly to the blades of the rotor of a helico-centrifugal turbine. In this case the fluid entering the apparatus through the nozzle 12 will set the rotor 19 and the inertia flywheel 20 in free rotation at a constant speed, so that the fluid will enter the annular collector 15 radially at the level of the circle 17, the rotation of the walls 14 of the space 13 about the axis X—X having practically no effect on the said radial flow.

It will be understood that in the above-described embodiments, an angular velocity about an axis X—X is detected by producing a radial or source flow away from the axis X—X and by picking up a part of the fluid at the periphery of this flow, in two tubes which are off-set in opposite directions relatively to two radii of the flow and which are rotated about the axis X—X at the velocity to be detected, the difference between the flows picked up in these two tubes being used as an output signal which can be amplified by purely hydraulic or pneumatic means.

What is claimed is:

1. A gyrometer for measuring angular velocity, comprising a conduit element having an axial inlet orifice and walls extending circumferentially of the axis of the inlet orifice; outlet means at the periphery of the conduit element, including two tubes fast with the said walls and inclined in opposite directions with respect to two respective radii of the conduit element; means for supplying fluid to the inlet orifice so as to create radial flow between the walls, from the inlet orifice towards the peripheral outlet means; and means for measuring the difference between the rates of fluid-flow into the respective tubes, whereby measurement of the said differential flow-rate enables the angular velocity of the conduit element about the axis to be determined.

2. A gyrometer according to claim 1, wherein the walls of the conduit element comprise two parallel spaced discs, one of which has an opening centrally therein having an edge defining the said inlet orifice, and wherein the gyrometer further includes a pipe extending axially of the conduit element and fixed to the said edge of the said opening, the outlet means including an annular collector fixed peripherally of the said discs, the collector being open between the discs and having at least one discharge outlet at the periphery thereof, the tubes being located in a plane at right angles to the axis and being fixed to the annular collector so as to open substantially intermediately between the peripheral edges of the discs.

3. A gyrometer according to claim 1, comprising a shaft, a bladed rotor between the walls, fast with the shaft, and an inertia flywheel fast with the shaft, the shaft being mounted for free rotation, together with the rotor and the flywheel, about the axis.

4. A gyrometer according to claim 3, wherein the rotor has helical blades, so that the rotor is rotated by the fluid, the inclination of the helical blades being such that the blades are adapted to cause the fluid to issue radially from between the walls.

5. A gyrometer according to claim 3, wherein the rotor has helico-centrifugal blades of such a form that the rotor is adapted to be rotated by the fluid, while the blades are adapted to cause the fluid to issue radially from between the walls.

References Cited

UNITED STATES PATENTS

| 3,205,715 | 9/1965 | Meek | 73—505 X |
| 3,320,815 | 5/1967 | Bowles | 73—05 |

RICHARD C. QUEISSER, *Primary Examiner.*

EDWARD D. GILHOOLY, *Assistant Examiner.*